United States Patent [19]

Ribi et al.

[11] Patent Number: 6,046,455
[45] Date of Patent: Apr. 4, 2000

[54] INTEGRATING ULTRAVIOLET EXPOSURE DETECTION DEVICES

[75] Inventors: Hans O. Ribi, Hillsborough; David A. Frankel, Palo Alto, both of Calif.

[73] Assignee: Segan Industries, Burlingame, Calif.

[21] Appl. No.: 09/016,683

[22] Filed: Jan. 30, 1998

[51] Int. Cl.[7] .................................................. G01J 5/48
[52] U.S. Cl. .................................. 250/372 R; 250/474.1; 250/372 EM
[58] Field of Search ........................ 250/372 R, 372 EM, 250/474.1; 430/270.1, 495.1; 436/2, 58

[56] References Cited

U.S. PATENT DOCUMENTS

| | | | |
|---|---|---|---|
| 3,710,115 | 1/1973 | Jubb | 250/83.3 |
| 4,389,217 | 6/1983 | Baughman et al. | 250/474.1 |
| 5,028,792 | 7/1991 | Mullis | 250/474.1 |
| 5,581,090 | 12/1996 | Goudjil | 250/474.1 |
| 5,618,735 | 4/1997 | Saul et al. | 436/518 |
| 5,622,872 | 4/1997 | Ribi | 436/518 |
| 5,685,641 | 11/1997 | Ribi | 374/162 |

*Primary Examiner*—Edward P. Westin
*Assistant Examiner*—Richard Hanig
*Attorney, Agent, or Firm*—Bertram Rowland; Rae-Venter Law Group, P.C.

[57] ABSTRACT

Diyne monomers are used as photochromic agents in devices or formulations. The devices and formulations may be applied to body parts for semi-pemanent attachment at various sites to allow for detection of levels of ultraviolet radiation. Clear films may be placed on eyeglass lenses to detect UV radiation occurring between the lens and the eye.

21 Claims, No Drawings

INTEGRATING ULTRAVIOLET EXPOSURE DETECTION DEVICES

INTRODUCTION

While exposure to sunlight may have some benefits, particularly the healthy appearance of a tan, ultraviolet radiation has substantial detrimental effects. The ultraviolet radiation can cause rapid aging and hardening of the skin, much like the tanning of leather. In addition, the ultraviolet radiation can cause severe erythmia, which in severe cases can be physically debilitating. Of particular concern, the ultraviolet radiation can cause DNA damage, which can lead to skin cancer or other cellular proliferative diseases. Skin cancer is the most prevalent of all cancers and is among the most preventable forms of cancer. Basal cell carcinoma is very common among those with fair skin and hair, but while rarely metastasizing can spread to bone. Malignant melanoma develops on the skin of about 35 thousand Americans annually, resulting in about 7 thousand annual deaths. Finally, squamous cell carcinoma, which is found on the ear, face, lips and mouth, is the second most common skin cancer in Caucasians, resulting in about 2.3 thousand deaths annually. UV radiation can also result in severe eye damage, leading to corneal burns, retinal burns, pingueculae and pterygium, cortical cataracts and macular degeneration. Cataracts are the major cause of visual impairment, with UV exposure being among the leading causes. Worldwide, 17 million people are blinded by cataracts, with nearly 1.5 million cataract extractions being performed annually in the United States.

Children, elderly, immunocompromised individuals, individuals with skin disorders, e.g. lupus erythematous patients, or others particularly susceptible or sensitive to ultraviolet radiation are particularly vulnerable to the injuries and disorders resulting from UV radiation. These susceptible individuals should have the capability of being warned about overexposure. In many cases, individuals rely on a suntanning screen which absorbs ultraviolet light. However, these screens and lotions are lost over time due to sweat, abrasion, exposure to water, and the like. Under these circumstances, the protection is lost and the person is subjected to unwanted ultraviolet radiation. UV protective coatings are available for eye ware. However, individuals have no convenient way of knowing the level of protection they are receiving. Also, UV lens coatings cannot protect against stray light which enters around the glasses.

There is a need for practical UV detection devices, which can be conveniently used and carried, so that they are available when the need arises. A number of photochemical systems have been described in the literature to act as dosimeters for ultraviolet light. See for example, U.S. Pat. Nos. 5,581,090; 5,028,792,; 3,710,115 and references cited therein. Also, devices have been made available, such as a card, UV Card, available from the South Seas Trading Co., and a UV meter, called SafeSun, available from Online Catalog.

However, to ensure that there is wide acceptance of the product, a UV sensor should be small and non-intrusive, waterproof and durable, useful in conjunction with a sunscreen, easy to store and disposable, easy to use and interpret and provide a consistent and accurate registration of UV radiation.

SUMMARY OF THE INVENTION

Devices and compositions are provided for integratively detecting ultraviolet exposure of skin. Devices and compositions comprise a carrier and a photochromic substance which changes color upon exposure to ultraviolet light. Particularly, diacetylenes are used in a form which adheres to the skin or eye ware, which can be removed when exhausted or desired. The devices are in convenient forms which encourage their use, being readily carried, conveniently packaged, non-intrusive, disposable and easy to interpret.

DESCRIPTION OF THE SPECIFIC EMBODIMENTS

Integrating ultraviolet detection devices and compositions are provided. The devices and compositions allow for continuous monitoring of the ultraviolet radiation during the period of testing or exposure and ready removal once the period of testing or exposure has ended. For application, the devices are positioned so as to be retained during the period of testing or exposure and then readily removed afterwards. Therefore, the devices will for the most part be elastomeric and/or adherent. The devices are semi-permanent at the site at which they are placed, being removable without injury to the underlying substrate, usually skin. The devices also find application with eye ware.

The devices, while taking somewhat different forms, fulfill the characteristics of indicating the level of irradiation, providing a warning when the total irradiation has exceeded a safe amount, are easy to use and interpret, easy to store and readily disposable, small and non-intrusive, so as to be easily carried and stored on a person, waterproof and durable, can be used with a sunscreen and attractive to encourage use. In addition, the devices for placement on the skin will be transparent, so that they do not result in untanned portions of the skin, until the dye has substantially darkened. In addition, the devices may be coated with sun tan lotions, oils and creams, so that the devices may accurately record the amount of UV radiation to which the skin is exposed.

For the elastic bands, any elastomeric material which is not irritating to the skin and compatible with the photochromic agent may be employed. The elastomer will be substantially transparent or of sufficiently small dimension as not to leave a readily observable band upon tanning. Elastomers include: polyisobutylene, ethylenepropylene copolymers, polyisoprenes, polybutadienes, etc. Elastomers may be selected to absorb any sun tan protective coatings, much as the skin will absorb the coatings to varying degrees. These elastomers may be formed in bands or ribbons, generally having thicknesses of about 0.5 mm to about 5 mm, using not more than about 3 mm and may have the same width or be wider, depending upon the design and shape of the band. The band may be continuous or be joined by a link or clasp. If desired, a UV opaque cover may be employed, particularly one which is scored. By having the cover scored, individual portions of the cover may be removed, so that a single band may be used repeatedly, until the entire band has been exposed and exhausted. The cover may be paper or plastic, which will be able to withstand the conditions under which it is used. The band size or diameter is selected to fit snugly around a body part, such as a finger, wrist, forearm, bicep, ankle, or the like.

The elastomeric device may be preformed and combined with the photochromic agent, e.g. impregnated, painted, coated, sprayed, etc., or may be formulated with the elastomeric material and appropriately molded, extruded, cast, etc. The elastomeric device can be preformed, followed by impregnation with a solution of the photochromic agent, conveniently in combination with a polymer which aids in the coating and/or entry of the photochromic agent and retention in the elastomer. Polymers which may be employed include acrylic and styrene polymers, rubbers, and the like. Various solvents may be employed which will soften, but not dissolve, the elastomer and allow for impregnation of the elastomer with the photochromic agent. The solvent which is selected should be volatile, having a boiling point at ambient pressure above ambient temperature and less than about 100° C. and residues of the solvent should not be irritating to the skin. The solvent will soften the surface of the elastomer or may impregnate the elastomer to a portion of the thickness of the elastomer, but will normally not dissolve the elastomer, so that upon volatilization of the solvent, the elastomeric device will be in substantially the same form as originally. When coating the elastomeric surface, the coating solvent will usually provide for impregnation of the photochromic agent into the elastomer or provide a polymeric protective coating which retains the photochromic agent on the surface of the elastomeric device. Illustrative solvents include: chloroform, diethyl ether, ethyl acetate, butanone, tetrahydrofuran, toluene, dichloromethane and the like. The concentration of the photochromic agent will be sufficient to provide a visual change in color of the elastomer upon exposure to UV radiation and may vary depending upon the nature of the elastomer, the photochromic agent, and the like. Generally, the concentration would be in the range of about 10 to 500 mg/ml, preferably from about 50 to 250 mg/ml. If a polymeric agent is also present, this may be present in from about 10 to 500 mg/ml, more usually from about 50 to 200 mg/ml. Conveniently, various addition or condensation polymers may be used, such as acrylic, vinyl, polyalkylene, polyesters, polyether polymers.

After impregnation, the solvent will be evaporated, using vacuum, elevated temperatures, ambient conditions, or the like. During the treatment and thereafter during storage, the elastomeric devices should be protected from ultraviolet light, conveniently by being stored in an opaque container which does not transmit ultraviolet light or covered with an opaque cover.

One can provide for determining gradations of irradiation, by using varying amounts of the photochromic agent. Thus, by varying the amounts within the range indicated previously, one can provide for detecting different levels of exposure. For example, one may have a series of formulations with 50 mg/ml, 100 mg/ml, and 200 mg/ml, where the formulations are present at different sites of the device, where each will be exposed to the same amount of UV radiation. The darkness of the color generated by exposing the photochromic agent to irradiation can also be used to judge the amount of irradiation. Depending on the structure of the device, the photochromic agent may be present as a line, band, design, message, two-dimensional figure, or the like.

Instead of an elastomer, a non-elastomeric film, such as a tape, decal, or label, may be employed. The film is or has an adhesive suitable for adhering to the epidermis, including fingernails. Except for those epidermal areas which are not readily affected by UV radiation, e.g. fingernails, the film will be transparent. The film may be combined with the photochromic agent in a variety of ways. The film may be impregnated with the solution of the photochromic agent as described above. Alternatively, the photochromic agent may be applied as an ink to the surface of the film, whereby the photochromic agent becomes bound to the film. Various permanent inks or ink matrices which are commercially available may be employed, where the photochromic agent will be mixed with the ink, which ink may be clear (free of other dyes) or be colored with a color that does not interfere with the color development of the photochromic agent. The ink may be painted on to the film substrate by any convenient means, coating, spraying, printing or the like. The concentration of the photochromic agent for impregnation or coating will generally be about the same as the concentration range described above for the elastomer treating solutions.

Adherent devices will normally be adhered to a layer from which the adherent layer may be readily removed while still retaining the adhering layer to the photochromic agent containing film. A wide variety of protective layers are available, as exemplified with Bandaids®, label or decal materials, medical grade tapes, layers of adhesive tape, and the like. Alternatively, one can use an adhesive which can be separated from the surface of the device, when the device is in a roll.

The tapes may take a variety of forms, being opaque, such as adhesive tapes used for covering injuries, or clear, such as novelty tapes. A number of adhesives may be used which have acceptance in other situations, where the adhesive will strongly adhere to the substrate surface, but the tape may be removed by pulling the tape away from the surface. The tapes may come in a variety of sizes, being relatively small. The clear tape is preferred to allow for a more even tanning of the skin and minimally intrusive appearance. Usually tapes will vary in length from about 0.5 to 3 cm and in width from about 0.2 to 2 cm. The thickness of the layer containing the photochromic agent will be sufficient to allow the color change to be readily detected within the context of its use. Depending on the concentration of the photochromic agent, the required thickness will vary, generally varying in the range of about 0.1 to 1000µ, more usually 10–100µ.

Alternatively, the film may be a decal, which may be applied to the skin, where the decal will usually be at least partially colored so that its presence can be readily detected. The decal will be a preformed film, which will adhere to the skin when pressed against the skin, much as the adhesive tape. In some instances, the decal may require wetting before applying the decal to the skin. It may take a variety of geometric or odd shapes, being in the shape of figures, such as animals, objects, etc., where portions may be colored with a design, which design may be augmented by the development of the photochromic agent. The photochromic agent may result in a design, where the design may have different concentrations of the photochromic agent, so that the design will change as increasing areas of the design become developed. In this way a range of exposure to UV radiation may be determined. Alternatively, the agent may be printed adjacent to colored reference zones which indicate the degree of exposure compared to the darkness of the agent. These zones may be very small, so as to minimize the variation in tan or may be selected to provide a message which the wearer desires.

By virtue of the color change of the photochromic agent, various messages may be printed. By having a contrast between the region in which the photochromic agent is present and the remaining background, a message can be provided related to the status of the UV radiation or other information. Thus, one could print letters with the photochromic agent and provide a background the same as the photochromic agent, but not the same as when the photochromic agent has undergone a color change. Alternatively, one can provide that the message disappears, by having the background similar to the photochromic agent when it has became colored. One can also provide various colors as standards, as the region of the photochromic agent deepens in color. The standards can be related to various levels of UV radiation as described above. When using areas of different concentrations of the photochromic agent, one can provide for almost continuous gradations of UV radiation exposure, between the different concentrations and different standard colors. Transparent coatings or films that block UV light to varying degrees may be placed over areas of the photochromic agent to give differential sensitivities to exposure. These layers may be clear plastic films or clear glasses and may incorporate SPFs or other UV screening compounds.

The devices should have retentivity of the various protective sun coatings, so as to mimic the exposure of the skin. To that extent, the sun screens which are used should be compatible with the device. The film may be porous or non-porous to absorb the sun screen to an acceptable depth. The film should be wet by the sun screen in an analogous manner to the skin. Various plastics may be modified to provide the desired properties, such as chemical or physical modification, use of specific monomers to modify the characteristics of the bulk monomer, or thin coatings of a layer compatible with both the underlying substrate and the sun screen formulation.

One may also provide for various formulations which provide adherent coatings to a body surface, such as the skin, fingernails, or the like. For this purpose, one may use formulations such as fingernail polish formulations, e.g. acrylic paints, combined with the photochromic agent where the nail polish may be clear or colored with a color which does not interfere with the detection of the photochromic agent. A thin layer of the fingernail polish may be coated on one or more fingernails, so that upon UV exposure, the fingernails will turn colored. Alternatively, a hydrophobic composition may be employed, such as a balm, lotion, or the like, where various wax based formulations may be employed having from about 50 to 99 weight percent of a hydrophobic agent, e. g. hydrocarbons, hydrogenated oils, fatty acid esters, etc. Various additives may be included for texture, organoleptic properties, stability, or the like. These include such conventional additives as liposomes, polymerized liposomes, plastic microparticles, protein mixtures, cosmetic formulations and those used in balms.

The photochromic agent may be formulated with a sunscreen lotion as an emulsion, where the photochromic agent is encapsulated in droplets, including liposomes, which break down on spreading on the skin. The breakdown of the droplets results in a strongly adhering film, which will adhere to the skin under the UV radiation protective agent. Various polymers described previously, including celluloses, may be employed in the droplets. Exemplary formulations are described in U.S. Pat. Nos. 5,543,136; 4,897,259; 4,184,978 and 3,895,104. Alternatively, the photochromic agent can be an integral part of the liposome (e.g. diacetylenic lipid), such that the liposome can be both part of the liposome matrix and be the indicator of interest.

The photochromic agent may be readily mixed with the formulation to provide a stick, paint or lotion which formulation when applied to the skin will permit the photochromic agent to strongly adhere to the skin.

In each of these cases, the method of applying the photochromic agent and the base it is mixed with allows for its strong adherence and ready removal of the photochromic agent containing product by convenient means, well known in the literature. Nail polishes may be removed by gentle scrapping or with nail polish remover, balms, e.g. ChapStick®, and other coatings with soap, tapes and decals by pulling off or scraping, or the like.

The photochromic agents of the subject invention are diynes (conjugated diacetylenes), particularly acid, ester, urethane, amide, nitrile, and alcohol monomers of at least about 8 carbon atoms, and not more than about 36 carbon atoms, more usually from about 12 to 30 carbon atoms. The acetylenic groups will generally be displaced from the terminal carbon atoms by at least 1 carbon atom. Various derivatives of the functional groups of the diynes can serve to modify the properties of the diynes for use in a particular formulation. For further information concerning these compounds, see U.S. Pat. Nos. 5,685,641; 5,622,872; 5,618,735 and references cited therein, whose disclosures are herein incorporated by reference as to their more complete description of the monomers and their preparation and derivatives. These compounds are readily formulated as the monomers with a wide variety of formulations, without special requirements, except that they be protected from ultraviolet radiation. They can be dissolved in a wide variety of solvents, mixed with various polymers, and incorporated with different agents, so as to provide for stably dispersed compositions. Upon exposure to ultraviolet radiation, the compositions turn light blue to a black metallic luster.

The subject devices, particularly as clear adhesive films, find use to protect the eye against UV radiation, by using the film in conjunction with the lense of eyeglasses. In this case, one may determine the extent to which the eye has been exposed to ultraviolet light which has come through the lens and stray light which enters from outside the eyeglasses. Conveniently, the sensing film may be placed on the inside of the lens of the glasses, so that the wearer may be able to judge instantly or continuously the level of sun exposure within the eye glass-eye cavity. A light blue color will begin to appear upon mild sun exposure, while the color would deepen upon prolonged or more intense exposure. In addition, as discussed previously areas of different concentration of the photochromic agent may be present, so as to provide a graduation of exposure. Various films may be employed which are clear, such as acrylics, polyalkylenes, polyvinyl ethers and esters, etc., which can be coated with a clear adherent layer. The film may then be adhered to a corner of the lens and monitored during exposure to UV radiation.

The following examples are offered by way of illustration and not by way of limitation.

EXPERIMENTAL

Example 1

Elastic band sensors for general wear

Elastic band sensors were made with either rubber bands (2 inch in diameter, ¼ inch wide, and 1/32 inch thick rubber bands from Alliance Rubber Bands, USA, U.S. Pat. No. 3,787,552) or thin elastic stretch cord (standard white fabric shock cord 1/16 inch thick and 2 inch in diameter tied to create a loop). Ten bands were added to a 100 ml screw cap jar containing 50 ml of a monomer solution (150 mg/ml 10, 12-tricosadiyneoic acid in chloroform and 100 mg/ml V825 acrylic plastic) and agitated for 1 minute at room temperature. The bands were conveniently looped through a wire prior to dipping so that they could all be added, removed, and dried simultaneously. The bands were lifted from the solution, shaken over the jar to remove excess solvent, and air dried at room temperature for 3 hours to ensure that all solvent was evaporated. Upon drying, the elastic bands were ready for use as sun irradiation sensors by placing the band around the wrist or ankle and worn during normal activity in the sun.

Example 2

Elastic band sun sensors for finger ware

Elastic band sensors were made with either rubber bands (¾ inch in diameter, ¹⁄₁₆ inch wide, and ¹⁄₃₂ inch thick rubber bands from Goody Product, Inc.) or thin elastic stretch cord (standard white fabric shock cord ¹⁄₁₆ inch thick and ¾ inch in diameter tied to create a loop). Ten bands were added to a 100 ml screw cap jar containing 50 ml of a monomer solution (150 mg/ml 10, 12-tricosadiyneoic acid in dichloromethane) and agitated for 1 minute at room temperature. The bands were conveniently looped through a wire prior to dipping so that they could all be added, removed, and dried simultaneously. The bands were lifted from the solution, shaken over the jar to remove excess solvent, and air dried at room temperature for 3 hours to ensure that all solvent was evaporated. Upon drying, the elastic bands were ready for use as sun irradiation sensors by placing the band around a finger and worn during normal activity in the sun.

Example 3

Medical tape sun sensors for general placement

A 10 foot roll stock medical tape (¼ inch wide transparent easy-tear medical grade) plastic tape was decorated with a ¹⁄₁₆ inch wide line along its length with an ink line containing the monomer 10, 12-tricosadiyneoic acid (TDA). The ink line was made with a pen (orange Sharpie brand permanent ink pen). The pen cartridge was removed and the orange ink placed in a 4 dram vial. TDA was added to the ink volume to bring the final concentration to 75 mg TDA/ml ink. The TDA ink mixture was added back to the pen cartridge and replaced in the pen. The tape was mounted on a spool mechanism such that the pen tip made an orange line along the non-adhesive side of the tape as the tape was spooled from one roller to another. The tape was spooled at a rate which allowed the ink to dry prior to overlap between layers. Convenient, ready-to-use sun sensor strips were made by tearing a small piece of tape and applying the piece to skin or clothing. Upon prolonged sun exposure, the orange line turned to a dark black-blue line indicating a high level of UV irradiation.

Tape sensor strips could also be made with dual lines on the tape where one line was made using an orange pen without TDA monomer and the parallel adjacent line was made with TDA monomer. This configuration provided for a tape strip with an orange reference color for an individual for color change comparison.

Example 5

Balm stick for application to skin and other surfaces

A solid wax-like stick was made using a melted mixture of 44% petrolatums, 1.5% Padimate 0.1% lanolin, 1% isopropyl myristate, and 0.5% cetyl alcohol extracted from a stick of ChapStick™. Three percent by weight 10, 12-pentacosadiyneoic acid was added and melted into the mixture. The component mixture was heated to a liquid form (greater than 150° F.) in a glass vessel, mixed by stirring, and poured into a plastic cylinder/dispenser with a screw crank at one end. The plastic dispenser was 2 inches long and ½ inch in diameter with a protective cap at its open end. The mixture was allowed to cool at room temperature for 1 hour.

The sun sensor balm could be readily applied to any skin surface, finger nails, or other body part intended to be exposed to sunlight. Upon coating, the balm leaves an invisible film. A light blue color begins to appear upon mild sun exposure. A deep dark blue color appears upon prolonged exposure. The balm can be conveniently washed off using mild soap or wiped off using a napkin.

Example 6

Acrylic paint/finger nail polish sun sensor

A transparent sun sensor paint/polish was made by adding the monomer 10, 12-pentacosadiyneoic acid (PDA) to a clear commercially available nail polish finish (Orly Snap, Orly International, Inc., made with ethyl acetate, butyl acetate, isopropyl alcohol, nitrocellulose, dibutylphthalate, polyvinyl butyral, etocrylene, D&C red #6 barium lake, D&C violet #2) to a final concentration of 100 PDA/ml nail polish finish. The PDA monomer was mixed to clarity. Thin films were made on both a finger nail and a removable adhesive band. The polish dried within minutes. Upon drying the sun sensor polish was exposed to sunlight. A light blue color begins to appear upon mild sun exposure. A deep dark blue color appears upon prolonged exposure. The polish can be easily removed by gentle scraping or with standard finger nail polish remover.

Example 7

Multiple exposure level sensor

A multi-exposure level sun sensor was made using polish paints. Transparent sun sensor paint/polish was made by adding the monomer 10, 12-pentacosadiyneoic acid (PDA) to a clear commercially available nail polish finish (Orly Snap, Orly International, Inc.) made with ethyl acetate, butyl acetate, isopropyl alcohol, nitrocellulose, dibutylphthalate, polyvinyl butyral, etocrylene, D&C red #6 barium lake, D&C violet #2) to a final concentration of 200 mg PDA/ml nail polish finish, 100 mg PDA/ml nail polish finish, and 50 mg PDA/ml nail polish finish. The PDA monomer was mixed to clarity. Three side-by-side spots were painted with each of the PDA/polish concentrations. The spot containing the lowest concentration of PDA required the longest time to obtain a dark blue color, the middle spot required the second longest exposure time to sunlight, and the spot containing the highest concentration of PDA required the least exposure time to obtain a dark blue appearance. The exposure time required for changing each spot was linear in time in relationship to the concentration of PDA monomer in a specific spot.

The multiple exposure level sensor is ideal for indicating minimal-safe exposure levels for individuals with different exposure tolerances. For example, individuals with extremely sensitive skin should minimize any further exposure when the first and most sensitive spot turned dark blue whereas individuals with a high tolerance to sun exposure should minimize further exposure when the least sensitive spot turns dark blue.

Example 7

Stick-on sun sensor tabs for eye ware

Transparent tape stickers (¼ inch in diameter circles made with acrylic based adhesive label dye cut and placed on a convenient removal strip) were coated with a solution of 100 mg PDA/ml chloroform. The coating thickness was about 200 microns. The coating was allowed to dry for 6 hours at room temperature prior to use. The sensor labels can be conveniently placed on any surface to be exposed to ultraviolet light. The sensor labels were placed on the interior of sunglasses to determine the amount of stray and transmitted light that can enter the cavity between the glass lens and the eye. The sensor label is convenient for the individual who wears the sun glass to determine the amount of UV radiation to which the eye is exposed. A simple glance to the location of the sensor allows one to judge instantly or continuously the level of sun exposure within the eye glass-eye cavity. A light blue color begins to appear upon mild sun exposure. A deep dark blue color appears upon prolonged exposure.

Example 8

Reverse message exposure sun sensor

Standard white pressure sensitive labels (Avery ⅝ inch by 1¼ inch Multi-Purpose 05428 S1020) were coated with a solvent monomer solution containing 150 mg 10, 12-tricosadiyneoic acid dissolved in chloroform. The solution was dispensed from a felt-tipped marker (Custom Color-T, from Tria). A single coating was applied with single brush strokes and the solvent allowed to dry at room temperature for 5 minutes. White lettering messages were printed on the white background labels using a standard typewriter and typewriter correction film (KO-REC-TYPE, part number 3). White letter messages were typed directly over the pre-coated labels. Messages included: Safe exposure level achieved; Avoid further exposure; Enough sun for today; and the like. Upon sunlight exposure for 10 minutes (direct sunlight at 12:00 noon) the label's background started turning light blue the words being only partially visible. After 30 minutes exposure, the messages became clearly apparent indicating adequate sun exposure and that further exposure should be avoided.

Example 9

Sun sensor with color indicator for exposure level

Transparent plastic sun sensor decals with an adhesive backing were prepared using clear ink jet transparency film. A standard ink jet printer (Hewlett Packard model 620 Ink Jet Printer) and a standard software graphics program were used to develop a series of light blue to dark blue squares (¼ inch square). Color tones were picked which matched the blue tones of the PDA monomer as it becomes irradiated over an hour period in intense sunlight. Five side-by-side blue squares were lined up linearly with the lightest blue square to the left. The words "low exposure" were written above the light blue squares and the words "high exposure" were written above the dark blue squares. A linear strip (⅛ inch wide) of monomer solution was painted directly below the row of blue squares. The strip was coated with a solvent monomer solution containing 150 mg 10, 12-tricosadiyneoic acid dissolved in chloroform. The solution was dispensed from a felt-tipped marker (Customer Color-T, from Tria). A single coating was applied with single brush strokes and the solvent allowed to dry at room temperature for 5 minutes.

The sun sensor was placed in bright direct sunlight for a period of 10 to 60 minutes. The monomer strip started to turn light blue after 10 minutes indicating a low level of exposure. During a 60 minute exposure the strip continued to become quantitatively darker indicating that a resulting high level of exposure had been achieved.

Example 10

Rub on sun sensor tattoo

Rub on non-permanent tattoos are made using a thin adhesive membrane plastic which have been printed with a monomer solution containing 100 mg 10, 12-tricosadiyneoic acid dissolved in a 50:50 mixture of chloroform and acetone. The monomer/solvent mixture was allowed to dry at room temperature for 10 minutes. Designs representing cartoon characters and animals were created in a rubber stamp using commercial vendors as sources. An associated message "Enough Sun for Today" was printed in conjunction with the designs. One inch in diameter label-tattoos were printed with the design/message on lift off paper. The initial appearance of the label-tattoos was clear and transparent. A label-tattoo, which initially appeared colorless, was placed on bare skin and exposed to direct sunlight. Upon application to the skin and exposure to intense sunlight, the design and message became blue. After 10 minutes exposure, the design and message was faintly blue and after 60 minutes exposure, the design became a vivid blue color.

The label-tattoo format is fun, amusing, and can be made attractive for children to wear and encourages continual usage. It also serves as a reminder to parents that their children have been exposed to a certain level of UV irradiation. In addition, the label-tattoo can be used for day care, ski lessons, swimming lessons and other outdoor activities involving sun exposure and children.

It is evident from the above results, that a convenient method for detecting ultraviolet radiation is provided. Anyone can use the devices and compositions for monitoring the level of UV radiation exposure. Of particular importance is the opportunity to protect those people who are sensitive to ultraviolet radiation in a simple convenient manner. The individual can monitor exposure under a wide variety of circumstances using different methods for mounting or administering the photochromic agent containing device or composition to the individual. The various devices and compositions can be readily packaged so as to be easily carried and to be employed at any time the individual is concerned about exposure.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method of detecting a preselected amount of UV radiation in association with a body part, said method comprising:
   placing on said body part a device or composition comprising an amount of a diyne monomer as a photochromic agent sufficient to change to a detectable color upon exposure to a predetermined amount of UV radiation, wherein said device or composition is semi-permanent being removable without harm to said body part and said device comprises an elastomeric band or non-elastomeric transparent adherent film and said composition comprises an adherent plastic or petrolatum incorporating said photochromic agent.

2. A method according to claim 1, wherein said device is an elastic band.

3. A method according to claim 1, wherein said device is an adherent tape.

4. A method according to claim 1, wherein said device is a decal.

5. A method according to claim 1, wherein said composition is a nail polish.

6. A method of detecting a plurality of different amounts of UV radiation in association with a body part, said method comprising:

placing on said body part a device comprising areas having differing amounts of a diyne monomer as a photochromic agent sufficient to change to a detectable color upon exposure to predetermined amounts of UV radiation, wherein said device is semi-permanent being removable without harm to said body part and said device comprises an elastomeric band or non-elastomeric transparent adherent film.

7. A method according to claim 6, wherein said device is an elastic band.

8. A method according to claim 6, wherein said device is an adherent transparent tape.

9. A method according to claim 6, wherein said device is a decal.

10. A device for detecting a predetermined amount of UV radiation and designed for wearing on a body part comprising an elastomeric composition and a diyne monomer as a photochromic agent sufficient to change to a detectable color upon exposure to predetermined amounts of UV radiation.

11. A device according to claim 10 comprising a rubber band.

12. A device according to claim 10 comprising diyne monomer at a plurality of concentrations in different areas resulting in color changes at different levels of exposure to UV radiation.

13. A device for detecting a predetermined amount of UV radiation and placing on a body part comprising an adherent substrate and a diyne monomer as a photochromic agent sufficient to change to a detectable color upon exposure to predetermined amounts of UV radiation.

14. A device according to claim 13 comprising a decal, where said photochromic agent is present in a design.

15. A device according to claim 13, wherein said adherent substrate comprises an adhesive layer attached to a non-adhesive layer comprising said photochromic agent.

16. A device according to claim 15, wherein said photochromic agent is impregnated into said non-adhesive layer.

17. A device according to claim 15, wherein said photochromic agent is coated onto said non-adhesive layer.

18. A device according to claim 13 comprising diyne monomer at a plurality of concentrations in different areas resulting in color changes at different levels of exposure to UV radiation.

19. A device according to claim 13, further comprising at least one standard color region for comparison with the gradations of color change of said photochromic agent.

20. A device according to claim 13, wherein a portion of said device over said photochromic agent comprises a UV filtering composition.

21. An eyeglass lens to which is adhered a clear film comprising a diyneoic acid monomer as a photochromic agent sufficient to change to a detectable color upon exposure to predetermined amounts of UV radiation.

* * * * *